US012112908B2

(12) United States Patent
Takahashi et al.

(10) Patent No.: US 12,112,908 B2
(45) Date of Patent: Oct. 8, 2024

(54) ELECTROMAGNETIC RELAY

(71) Applicant: OMRON Corporation, Kyoto (JP)

(72) Inventors: Kei Takahashi, Kyoto (JP); Yuichiro Teshima, Kyoto (JP); Tomohiro Yamakita, Kyoto (JP); Koichiro Matsushima, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/952,312

(22) Filed: Sep. 26, 2022

(65) Prior Publication Data

US 2023/0109139 A1 Apr. 6, 2023

(30) Foreign Application Priority Data

Oct. 5, 2021 (JP) ................................ 2021-163974

(51) Int. Cl.

*H01H 50/60* (2006.01)
*H01H 45/12* (2006.01)
*H01H 50/14* (2006.01)
*H01H 50/58* (2006.01)

(52) U.S. Cl.

CPC ............ *H01H 50/60* (2013.01); *H01H 45/12* (2013.01); *H01H 50/14* (2013.01); *H01H 50/58* (2013.01)

(58) Field of Classification Search

CPC ........ H01H 50/12; H01H 50/02; H01H 50/14; H01H 50/18; H01H 50/54; H01H 50/60; H01H 45/12; H01H 50/58; H01H 50/546

USPC .............................................................. 335/2

See application file for complete search history.

(56) References Cited

U.S. PATENT DOCUMENTS 4,987,396 A * 1/1991 Bogner ................ H01H 1/2083 335/131
2005/0046527 A1* 3/2005 Chida .................... H01H 50/60 335/78
2018/0330906 A1* 11/2018 Hiramitsu .......... H05K 7/20236
2019/0123539 A1* 4/2019 Tahara ..................... H05K 1/00
2021/0083404 A1* 3/2021 Harimochi ............. H01H 50/12
2021/0090836 A1* 3/2021 Otsuka ................... H01H 50/14
2023/0223223 A1* 7/2023 Itou ...................... H01H 50/546 335/185

FOREIGN PATENT DOCUMENTS

JP 5547011 B2 * 7/2014
JP 2021-57225 A 4/2021

* cited by examiner

*Primary Examiner* — Shawki S Ismail
*Assistant Examiner* — Lisa N Homza
(74) *Attorney, Agent, or Firm* — SHINJYU GLOBAL IP

(57) ABSTRACT

An electromagnetic relay includes a housing, a first fixed terminal, a movable contact piece, a drive device, and a first heat dissipation member. The first fixed terminal protrudes from inside the housing to outside the housing. The movable contact piece is disposed in the housing. The movable contact piece faces the first fixed terminal. The drive device moves the movable contact piece in a contact direction and an opening direction. The first heat dissipation member is disposed outside the housing. The first heat dissipation member is provided separately from the first fixed terminal. The first heat dissipation member is connected to the first fixed terminal.

13 Claims, 14 Drawing Sheets

ELECTROMAGNETIC RELAY

CROSS-REFERENCE TO RELATED APPLICATION

This application claims priority to Japanese Patent Application No. 2021-163974, filed Oct. 5, 2021. The contents of that application are incorporated by reference herein in their entirety.

FIELD

The present invention relates to an electromagnetic relay.

BACKGROUND

An electromagnetic relay includes a fixed terminal, a movable contact piece, and a housing. For example, as disclosed in Japanese Patent Application publication No. 2021-057225, the fixed terminal protrudes from the inside of the housing to the outside of the housing. The movable contact piece is configured to move in a contact direction and an opening direction. The contact direction is a direction in which the movable contact piece contacts the fixed terminal. The opening direction is a direction in which the movable contact piece separates from the fixed terminal. A current flows through the fixed terminal when the movable contact piece contacts the fixed terminal.

SUMMARY

When a large current flows through the electromagnetic relay, the amount of heat generated at the fixed terminals increases. Therefore, it is desired to improve heat dissipation by increasing the surface area of the fixed terminal. However, if the fixed terminal is enlarged in order to increase the surface area of the fixed terminal, the size of the electromagnetic relay is increased. An object of the present invention is to improve the heat dissipation performance of a fixed terminal while suppressing an increase in the size of an electromagnetic relay.

An electromagnetic relay according to one aspect of the present invention includes a housing, a first fixed terminal, a movable contact piece, a drive device, and a first heat dissipation member. The first fixed terminal protrudes from inside the housing to outside the housing. The movable contact piece is disposed in the housing. The movable contact piece faces the first fixed terminal. The drive device moves the movable contact piece in a contact direction and an opening direction. The contact direction is a direction in which the movable contact piece contacts the first fixed terminal. The opening direction is a direction in which the movable contact piece separates from the first fixed terminal. The first heat dissipation member is disposed outside the housing. The first heat dissipation member is provided separately from the first fixed terminal. The first heat dissipation member is connected to the first fixed terminal.

In the electromagnetic relay according to the present aspect, the surface area for radiating heat from the first fixed terminal is enlarged by the first heat dissipation member. Thereby, the heat dissipation in the first fixed terminal is improved. Also, the first heat dissipation member is disposed outside the housing. Therefore, an increase in size of the electromagnetic relay is suppressed.

The first heat dissipation member may have a bent shape. In this case, the surface area for radiating heat from the first fixed terminal is enlarged while arranging the first heat dissipation member in a small space.

The first heat dissipation member may be an auxiliary terminal through which the current from the first fixed terminal is divided. In this case, heat is dispersed between the first fixed terminal and the first heat dissipation member by shunting the current to the first heat dissipation member. Thereby, heat generation at the first fixed terminal is suppressed.

A lower end of the first heat dissipation member may be located below a lower end of the housing. In this case, it becomes easier to connect the first heat dissipation member to a substrate. The lower end of the first heat dissipation member may be located at the same height as a lower end of the first fixed terminal or below the lower end of the first fixed terminal. In this case, it becomes easier to connect the first heat dissipation member to the substrate.

The first heat dissipation member may be a heat dissipation fin to which a current from the first fixed terminal does not flow. In this case, the flexibility of the shape of the first heat dissipation member is improved.

The lower end of the first heat dissipation member may be located above the lower end of the housing. In this case, the first heat dissipation member is prevented from contacting the substrate. The lower end of the first heat dissipation member may be located above the lower end of the first fixed terminal. In this case, the first heat dissipation member is prevented from contacting the substrate.

The electromagnetic relay may further include a second fixed terminal and a second heat dissipation member. The second fixed terminal may protrude from inside the housing to outside the housing. The second heat dissipation member may be disposed outside the housing. The second heat dissipation member may be provided separately from the second fixed terminal. The second heat dissipation member may be connected to the second fixed terminal. The first heat dissipation member and the second heat dissipation member may be disposed on the same side with respect to the first fixed terminal and the second fixed terminal.

In this case, the surface area for radiating heat from the second fixed terminal is enlarged by the second heat dissipation member. Thereby, the heat dissipation in the second fixed terminal is improved. Also, the second heat dissipation member is disposed outside the housing. Therefore, an increase in size of the electromagnetic relay is suppressed. Furthermore, the first heat dissipation member and the second heat dissipation member are disposed on the same side with respect to the first fixed terminal and the second fixed terminal. Thereby, the first heat dissipation member and the second heat dissipation member are disposed compactly.

The first heat dissipation member and the second heat dissipation member may be disposed on the sides opposite to each other with respect to the first fixed terminal and the second fixed terminal. In this case, heat dissipation from each of the first heat dissipation member and the second heat dissipation member is improved.

The electromagnetic relay may further include a third heat dissipation member. The third heat dissipation member may be disposed outside the housing. The third heat dissipation member may be provided separately from the first fixed terminal. The third heat dissipation member may be connected to the first fixed terminal. The third heat dissipation member may be provided separately from the first heat dissipation member.

In this case, the surface area for heat dissipation is further increased by the first heat dissipation member and the third heat dissipation member.

The first fixed terminal may include a first surface and a second surface. The second surface may be located opposite the first surface. The first heat dissipation member may be disposed to face the first surface. The third heat dissipation member may be disposed to face the second surface. In this case, the layout of the first heat dissipation member and the third heat dissipation member is facilitated.

The third heat dissipation member may overlap the first heat dissipation member and be disposed to face the first surface. In this case, the first heat dissipation member and the third heat dissipation member are disposed compactly.

DETAILED DESCRIPTION

Figure 1:
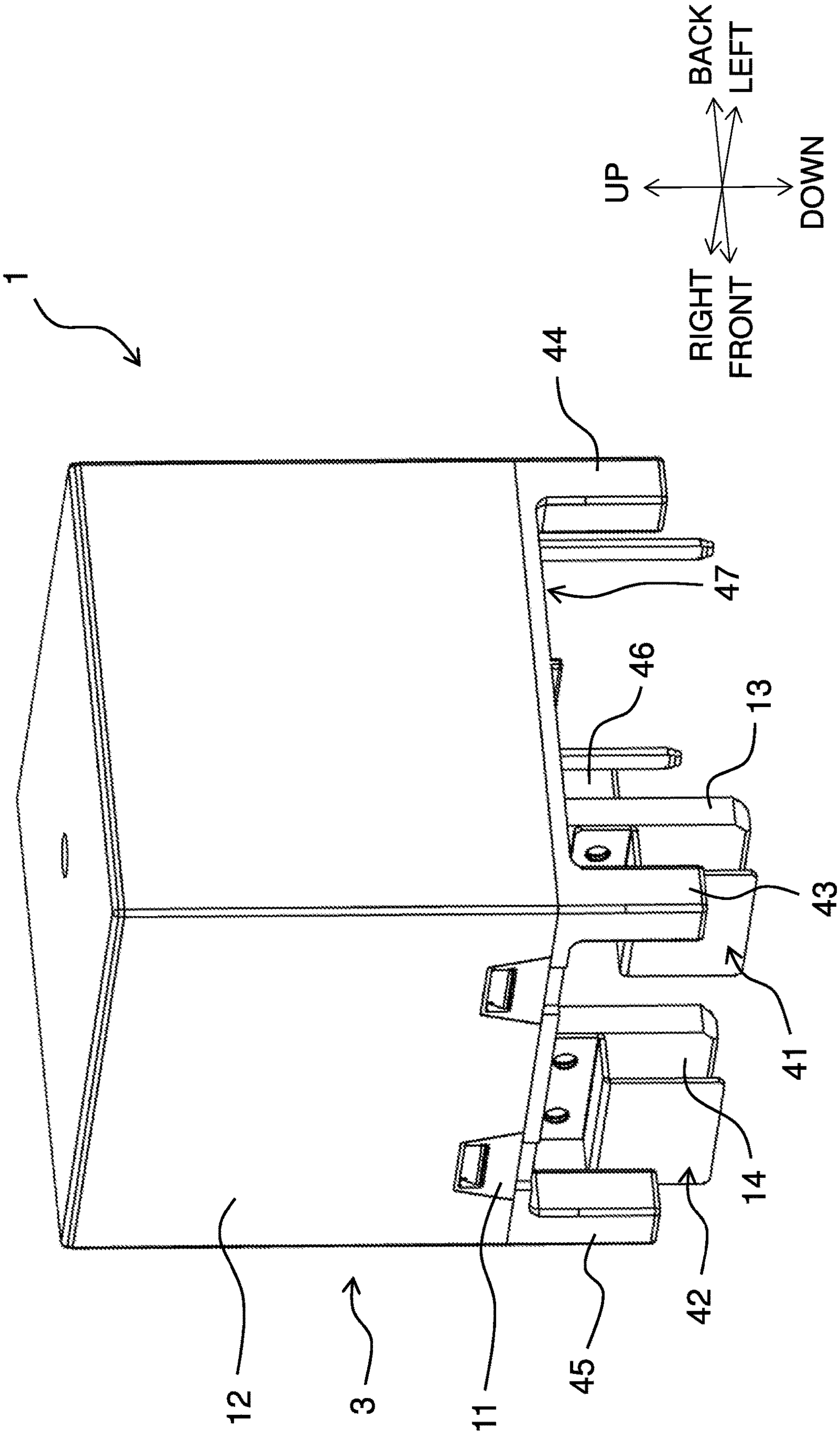
FIG. 1 is an external perspective view of an electromagnetic relay according to a first embodiment.
Figure 2:
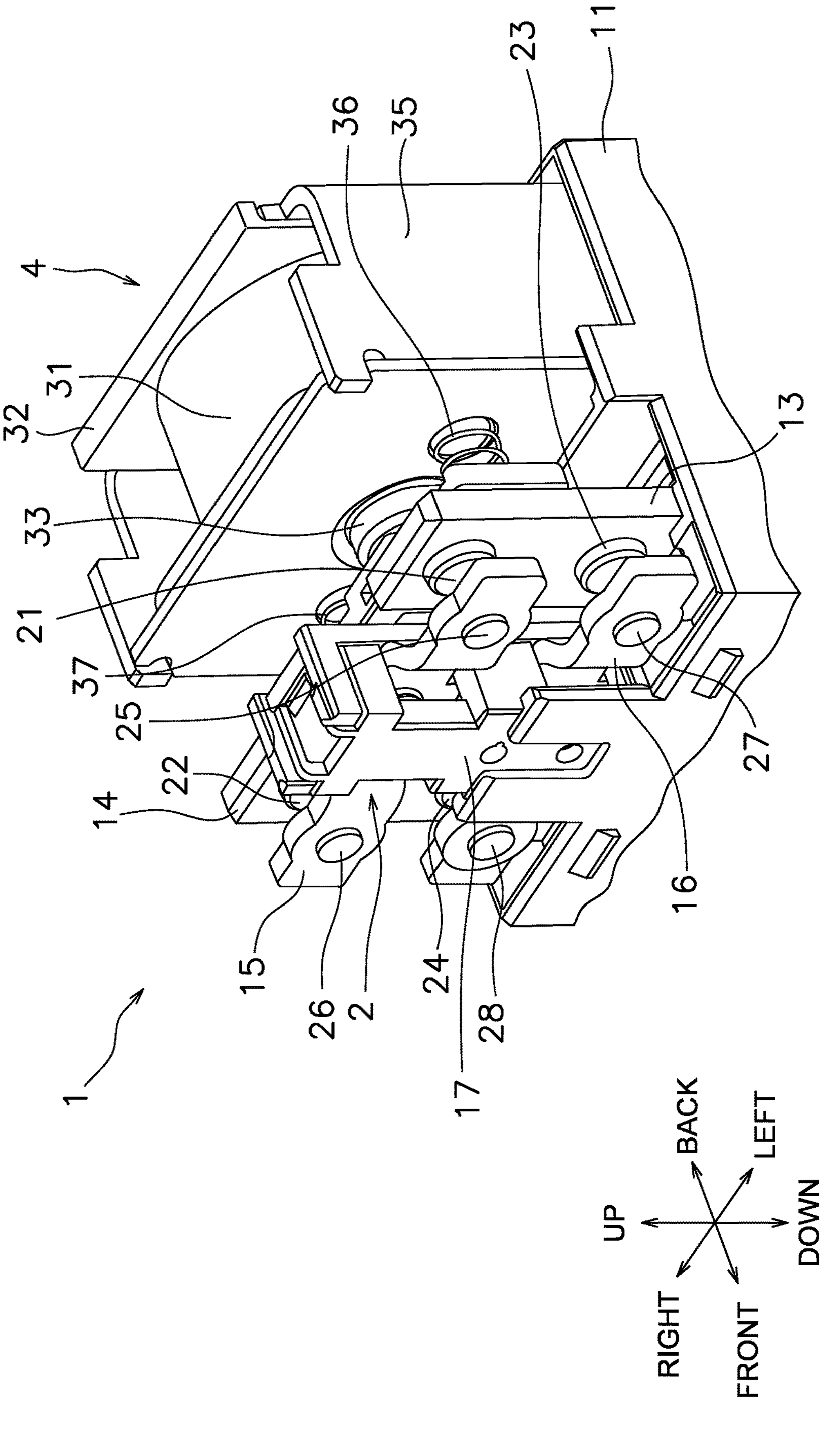
FIG. 2 is a perspective view of an inside of the electromagnetic relay.
Figure 3:
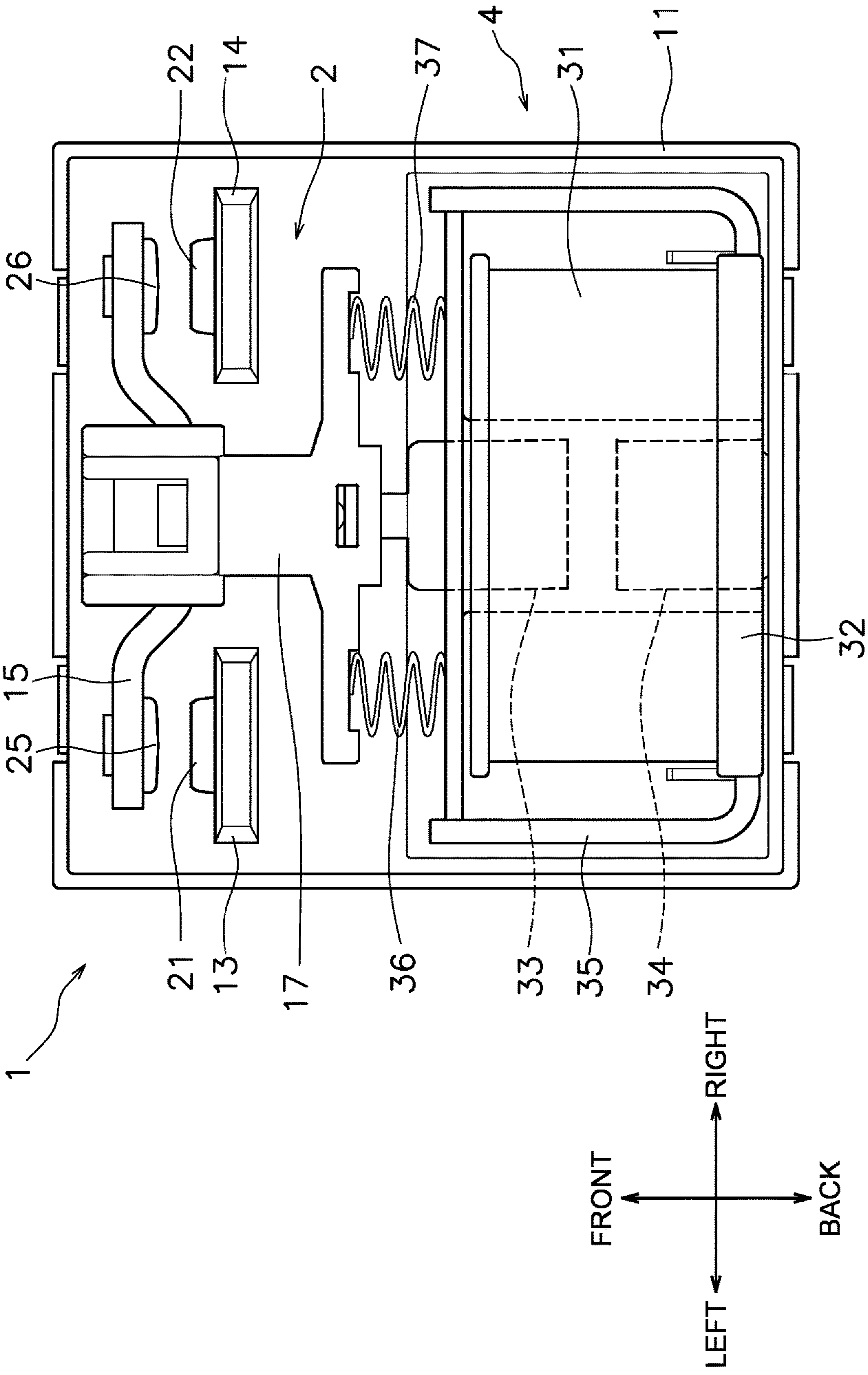
FIG. 3 is a top view of the electromagnetic relay when a moving member is in an open position.
Figure 4:
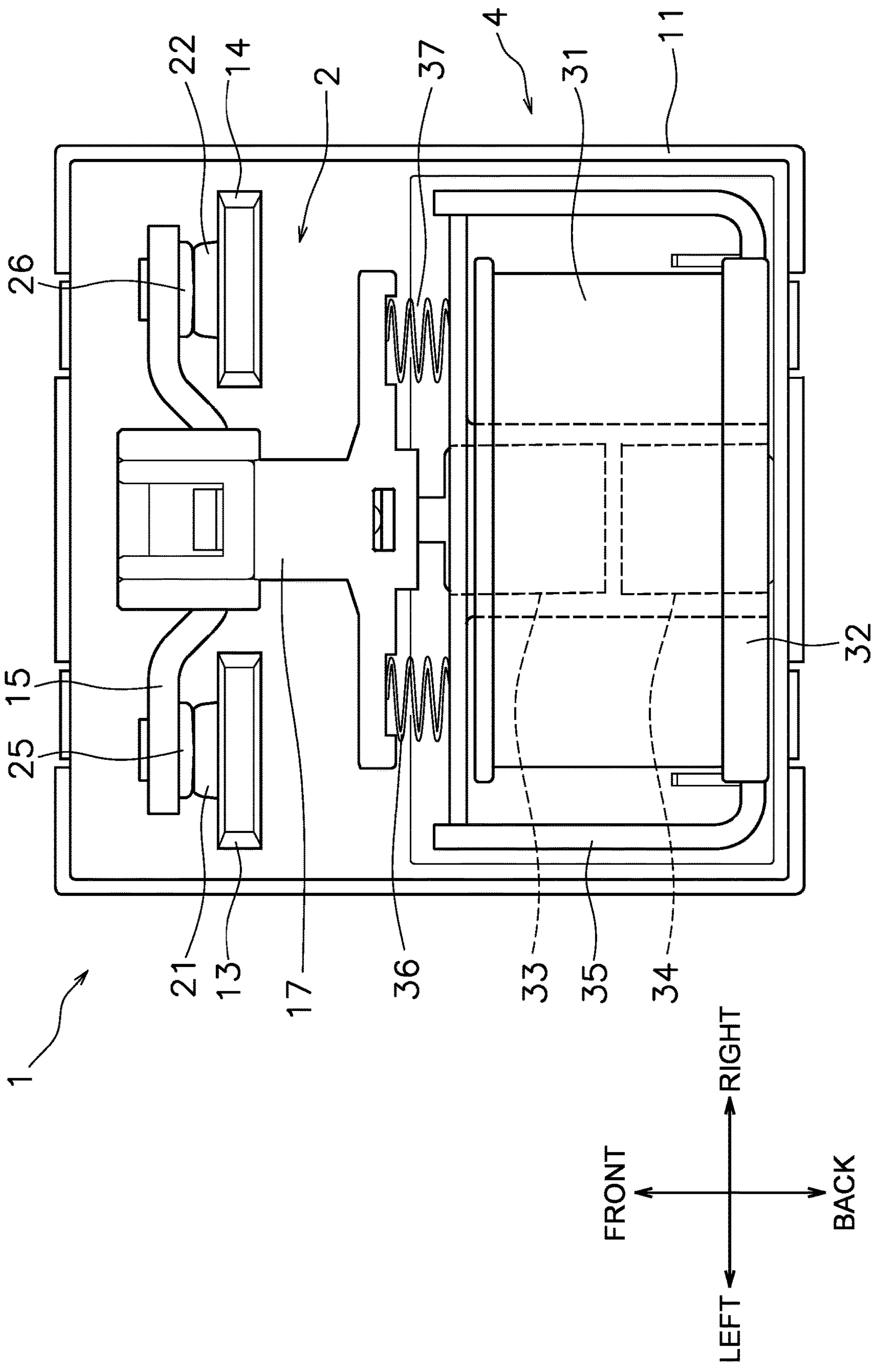
FIG. 4 is a top view of the electromagnetic relay when the moving member is in a closed position.

An electromagnetic relay 1 according to an embodiment will be described below with reference to the drawings. FIG. 1 is an external perspective view of an electromagnetic relay 1 according to a first embodiment. FIG. 2 is a perspective view of the inside of the electromagnetic relay 1. FIGS. 3 and 4 are top views of the inside of the electromagnetic relay 1.

The electromagnetic relay 1 includes a contact device 2, a housing 3, and a drive device 4. The contact device 2 and the drive device 4 are disposed in the housing 3. The housing 3 includes a base 11 and a case 12. The case 12 is omitted in FIGS. 2 to 4. The base 11 supports the contact device 2 and the drive device 4.

In the following description, the direction from the base 11 toward the contact device 2 and the drive device 4 is defined as upward, and the opposite direction is defined as downward. The direction from the drive device 4 towards the contact device 2 is defined as forward and the opposite direction as rearward. The direction perpendicular to the up-down direction and the front-back direction is defined as the left-right direction.

The contact device 2 includes a first fixed terminal 13, a second fixed terminal 14, a first movable contact piece 15, a second movable contact piece 16, and a moving member 17. The first fixed terminal 13 and the second fixed terminal 14 are made of a conductive material such as copper. The first fixed terminal 13 and the second fixed terminal 14 each extend vertically.

The first fixed terminal 13 and the second fixed terminal 14 are disposed apart from each other in the left-right direction. The first fixed terminal 13 and the second fixed terminal 14 are fixed to the base 11. The first fixed terminal 13 and the second fixed terminal 14 protrude from inside the housing 3 to outside of the housing 3. The first fixed terminal 13 and the second fixed terminal 14 protrude downward from the base 11.

A first fixed contact 21 and a third fixed contact 23 are connected to the first fixed terminal 13. A second fixed contact 22 and a fourth fixed contact 24 are connected to the second fixed terminal 14. The first to fourth fixed contacts 21 to 24 are made of a conductive material such as silver or copper.

The first movable contact piece 15 and the second movable contact piece 16 extend in the left-right direction. The first movable contact piece 15 and the second movable contact piece 16 are provided separately from each other. The first movable contact piece 15 and the second movable contact piece 16 are made of a conductive material such as copper.

The first movable contact piece 15 is disposed to face the first fixed terminal 13 and the second fixed terminal 14. A first movable contact 25 and a second movable contact 26 are connected to the first movable contact piece 15. The first movable contact 25 is disposed to face the first fixed contact 21. The second movable contact 26 is disposed to face the second fixed contact 22.

The second movable contact piece 16 is disposed to face the first fixed terminal 13 and the second fixed terminal 14. A third movable contact 27 and a fourth movable contact 28 are connected to the second movable contact piece 16. The third movable contact 27 is disposed to face the third fixed contact 23. The fourth movable contact 28 is disposed to face the fourth fixed contact 24. The first to fourth movable contacts 25 to 28 are made of a conductive material such as silver or copper.

The moving member 17 holds the first movable contact piece 15 and the second movable contact piece 16. The moving member 17 is made of an electrically insulating resin. The moving member 17 is movable in the front-rear direction. The moving member 17 is movable between a closed position and an open position. In FIG. 3, the moving member 17 is located in the open position. When the moving member 17 is in the open position, the movable contacts 25 to 28 are separated from the fixed contacts 21 to 24, respectively. In FIG. 4, the moving member 17 is located in the closed position. When the moving member 17 is in the closed position, the movable contacts 25 to 28 contact the fixed contacts 21 to 24, respectively.

The drive device 4 moves the first movable contact piece 15 and the second movable contact piece 16 by electromagnetic force. The drive device 4 moves the first movable contact piece 15 and the second movable contact piece 16 in the contact direction and the opening direction. The contact direction is a direction in which the movable contacts 25 to 28 contact the fixed contacts 21 to 24. The opening direction is a direction in which the movable contacts 25 to 28 separate from the fixed contacts 21 to 24. In this embodiment, the contact direction is rearward and the opening direction is forward.

The drive device 4 includes a coil 31, a spool 32, a movable iron core 33, a fixed iron core 34, and a yoke 35. The coil 31 is wound around the spool 32. At least part of the movable iron core 33 is disposed in the spool 32. The movable iron core 33 is configured to move in the front-rear direction. The fixed iron core 34 is disposed in the spool 32. The fixed iron core 34 is disposed to face the movable iron core 33. The coil 31 generates an electromagnetic force that moves the movable iron core 33 when energized.

The movable iron core 33 is connected to the moving member 17. The movable iron core 33 moves in the contact direction according to the magnetic force generated from the coil 31. As the movable iron core 33 moves, the moving member 17 moves to the closed position. The yoke 35 is disposed to surround the coil 31. The yoke 35 is disposed on the magnetic circuit formed by the coil 31.

The electromagnetic relay 1 includes a first return spring 36 and a second return spring 37. The first return spring 36 and the second return spring 37 are disposed between the moving member 17 and the drive device 4. The first return spring 36 and the second return spring 37 bias the moving member 17 in the opening direction.

Next, operation of the electromagnetic relay 1 will be described. When the coil 31 is not energized, the drive device 4 is not excited. In this case, the moving member 17 is pressed in the opening direction together with the movable iron core 33 by the elastic forces of the return springs 36 and 37, and the moving member 17 is located at the open position shown in FIG. 3.

In this state, the first movable contact piece 15 and the second movable contact piece 16 are also pressed in the opening direction via the moving member 17. Therefore, when the moving member 17 is at the open position, the first movable contact 25 and the second movable contact 26 are separated from the first fixed contact 21 and the second fixed contact 22. Similarly, when the moving member 17 is in the open position, the third movable contact 27 and the fourth movable contact 28 are separated from the third fixed contact 23 and the fourth fixed contact 24.

When the coil 31 is energized, the drive device 4 is excited. In this case, the electromagnetic force of the coil 31 causes the movable iron core 33 to move in the contact direction against the elastic forces of the return springs 36 and 37. Thereby, the moving member 17, the first movable contact piece 15, and the second movable contact piece 16 move together in the contact direction. Accordingly, as shown in FIG. 4, the moving member 17 moves to the closed position.

As a result, when the moving member 17 is in the closed position, the first movable contact 25 and the second movable contact 26 contact the first fixed contact 21 and the second fixed contact 22, respectively. Similarly, when the moving member 17 is in the closed position, the third movable contact 27 and the fourth movable contact 28 contact the third fixed contact 23 and the fourth fixed contact 24, respectively. Thereby, the first movable contact piece 15 and the second movable contact piece 16 are electrically connected to the first fixed terminal 13 and the second fixed terminal 14.

When the current to the coil 31 is stopped and demagnetized, the movable iron core 33 is pushed in the opening direction by the elastic forces of the return springs 36 and 37. As a result, the moving member 17, the first movable contact piece 15, and the second movable contact piece 16 move together in the opening direction. Accordingly, as shown in FIG. 3, the moving member 17 moves to the open position.

As a result, when the moving member 17 is at the open position, the first movable contact 25 and the second movable contact 26 are separated from the first fixed contact 21 and the second fixed contact 22. Similarly, when the moving member 17 is at the open position, the third movable contact 27 and the fourth movable contact 28 are separated from the third fixed contact 23 and the fourth fixed contact 24.

When a large current flows in the electromagnetic relay 1, the first and second fixed terminals 13 and 14 and the first and second movable contact pieces 15 and 16 become hot. As shown in FIG. 1, the electromagnetic relay 1 according to the present embodiment includes a first heat dissipation member 41 and a second heat dissipation member 42 for improving heat dissipation of the electromagnetic relay 1.

The first heat dissipation member 41 and the second heat dissipation member 42 are made of metal with high thermal conductivity such as copper. The first heat dissipation member 41 and the second heat dissipation member 42 have electrical conductivity. The first heat dissipation member 41 and the second heat dissipation member 42 are disposed outside the housing 3. The entire first heat dissipation member 41 is disposed outside the housing 3. The entire second heat dissipation member 42 is disposed outside the housing 3. The first heat dissipation member 41 and the second heat dissipation member 42 are disposed below the base 11.

Figure 5:
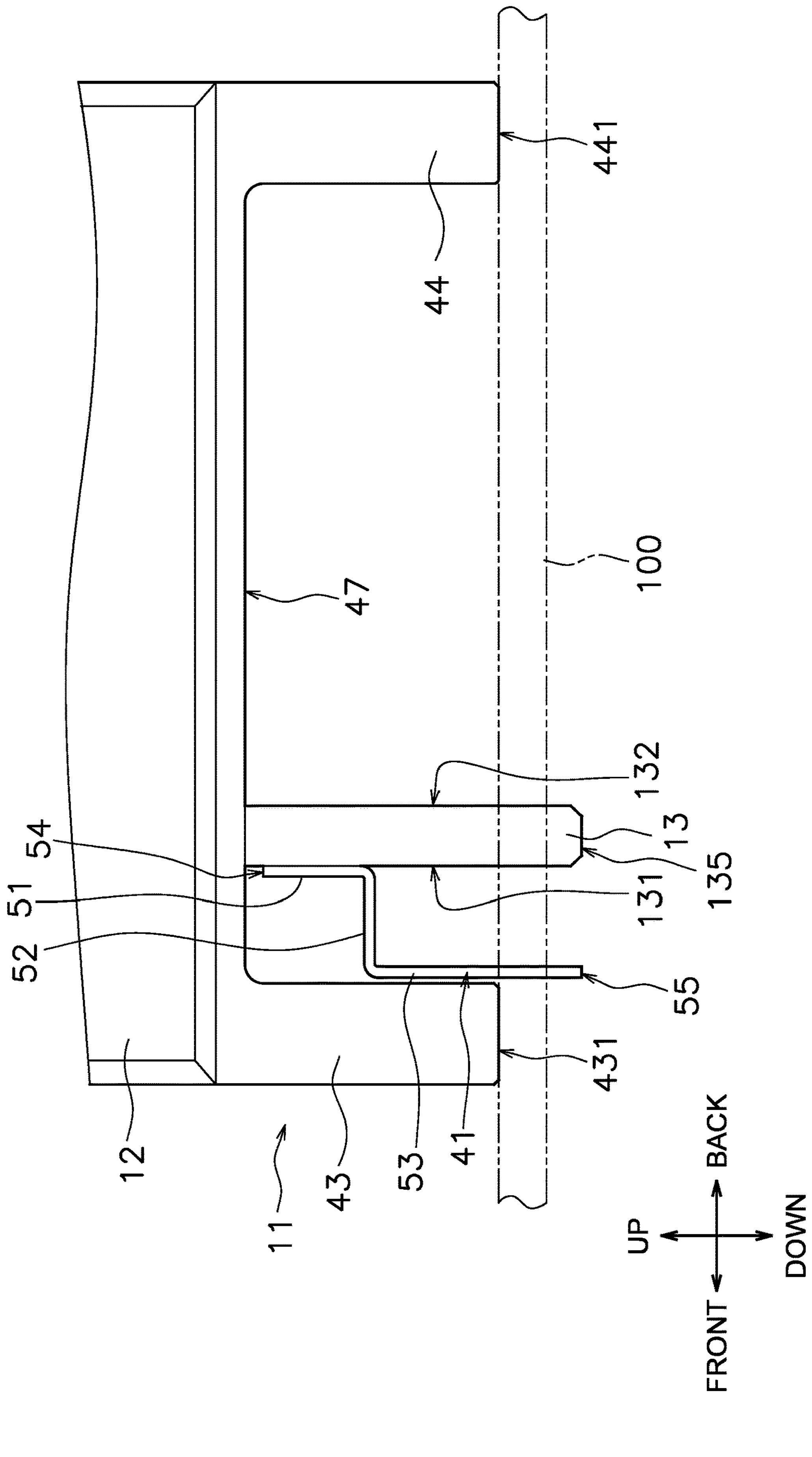
FIG. 5 is a side view showing a lower portion of the electromagnetic relay according to the first embodiment.

FIG. 5 is a side view showing the lower portion of the electromagnetic relay 1 according to the first embodiment. As shown in FIGS. 1 and 5, the base 11 includes a plurality of legs 43 to 46. The plurality of legs 43 to 46 protrude downward from the bottom surface 47 of the base 11. As shown in FIG. 5, the plurality of legs 43 to 46 contact a substrate 100 on which the electromagnetic relay 1 is mounted. The first heat dissipation member 41 and the second heat dissipation member 42 are disposed between the plurality of legs 43 to 46.

Figure 6:
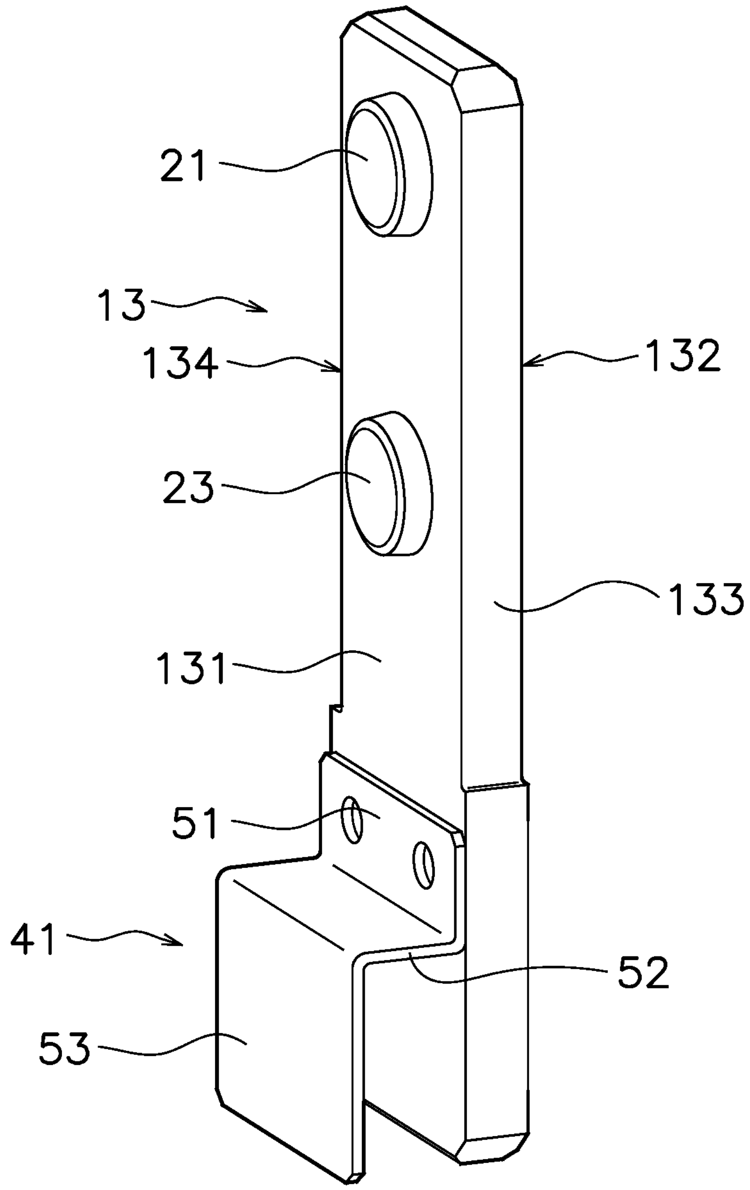
FIG. 6 is a perspective view of a first fixed terminal and a first heat dissipation member.

FIG. 6 is a perspective view of the first fixed terminal 13 and the first heat dissipation member 41. As shown in FIG. 6, the first fixed terminal 13 includes a first surface 131, a second surface 132, a first side 133, and second side 134. The first fixed contact 21 and the third fixed contact 23 are attached to the first surface 131. The second surface 132 is located opposite the first surface 131. The first surface 131 and the second surface 132 have a larger surface area than the first side 133 and the second side 134, respectively.

The first heat dissipation member 41 is provided separately from the first fixed terminal 13. The first heat dissipation member 41 is connected to the first fixed terminal 13. The first heat dissipation member 41 is connected to the first fixed terminal 13 outside the housing 3. The first heat dissipation member 41 is disposed to face the first surface 131 of the first fixed terminal 13. The first heat dissipation member 41 is connected to the first surface 131. The first heat dissipation member 41 is connected to the first fixed terminal 13 by, for example, welding or caulking. The first heat dissipation member 41 has a plate-like shape that is thinner than the first fixed terminal 13. The horizontal cross-sectional area of the first heat dissipation member 41 is smaller than the horizontal cross-sectional area of the first fixed terminal 13.

Specifically, the first heat dissipation member 41 includes a connecting portion 51, a step portion 52 and a terminal portion 53. The first heat dissipation member 41 is bent between the connecting portion 51 and the step portion 52. The first heat dissipation member 41 is bent between the step portion 52 and the terminal portion 53. The connecting portion 51 extends vertically. The connecting portion 51 is connected to the first fixed terminal 13. The step portion 52 extends in the front-rear direction from the connecting portion 51. The terminal portion 53 extends downward from the step portion 52. The terminal portion 53 is connected to the substrate 100.

As shown in FIG. 5, the upper end 54 of the first heat dissipation member 41 is located below the bottom surface 47 of the base 11. A lower end 135 of the first fixed terminal 13 is located below lower ends 431 and 441 of the legs 43 and 44. The lower end 55 of the first heat dissipation member 41 is located below the lower ends 431 and 441 of the legs 43 and 44. The lower end 55 of the first heat dissipation member 41 is located at the same height as the lower end 135 of the first fixed terminal 13. Alternatively, the lower end 55 of the first heat dissipation member 41 may be located below the lower end 135 of the first fixed terminal 13. The first heat dissipation member 41 is electrically connected to the substrate 100 together with the first fixed terminal 13. The first heat dissipation member 41 functions as an auxiliary terminal through which the current from the first fixed terminal 13 is shunted.

Figure 7:
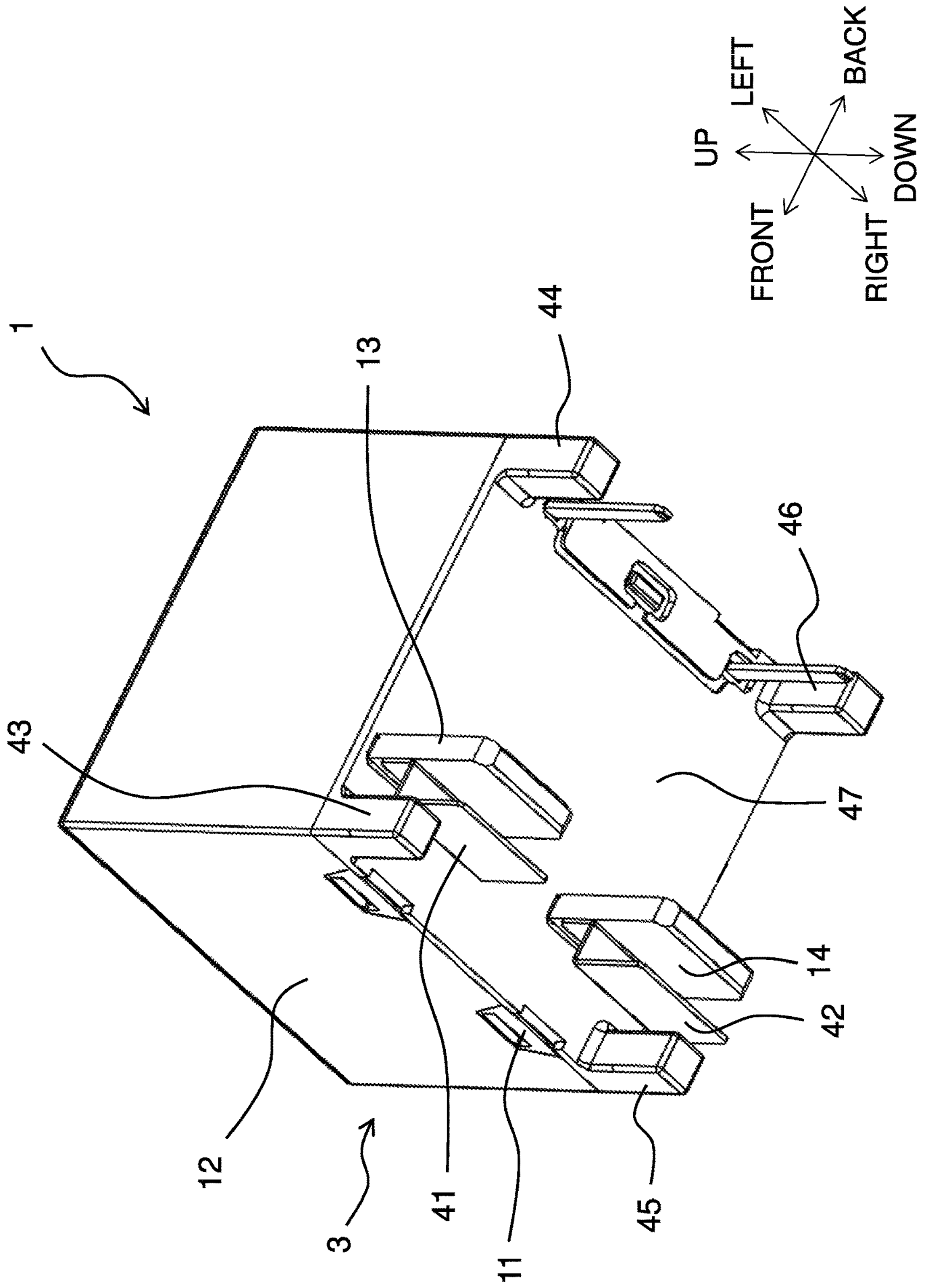
FIG. 7 is a bottom perspective view of the electromagnetic relay according to the first embodiment.

The second heat dissipation member 42 is provided separately from the second fixed terminal 14. FIG. 7 is a perspective view of the electromagnetic relay 1 as seen from below. As shown in FIGS. 1 and 7, the second heat dissipation member 42 is connected to the second fixed terminal 14. The second heat dissipation member 42 is connected to the second fixed terminal 14 outside the housing 3. The second heat dissipation member 42 is connected to the second fixed terminal 14 by, for example, welding or caulking. The second heat dissipation member 42 has the same shape as the first heat dissipation member 41.

The first heat dissipation member 41 and the second heat dissipation member 42 are disposed in the same direction with respect to the first fixed terminal 13 and the second fixed terminal 14. That is, the first heat dissipation member 41 is disposed in front of the first fixed terminal 13. The second heat dissipation member 42 is disposed in front of the second fixed terminal 14. Alternatively, the first heat dissipation member 41 may be disposed behind the first fixed terminal 13. The second heat dissipation member 42 may be disposed behind the second fixed terminal 14.

In the electromagnetic relay 1 according to the present embodiment described above, the surface area for radiating heat from the first fixed terminals 13 is increased by the first heat dissipation member 41. Thereby, the heat dissipation in the first fixed terminal 13 is improved. The second heat dissipation member 42 increases the surface area for radiating heat from the second fixed terminal 14. Thereby, the heat dissipation in the second fixed terminal 14 is improved. Also, the first heat dissipation member 41 and the second heat dissipation member 42 are disposed outside the housing 3. Therefore, an increase in size of the electromagnetic relay 1 is suppressed.

Also, the current flowing through the first fixed terminal 13 is branched to the first heat dissipation member 41. Thereby, the heat from the electromagnetic relay 1 is distributed to the first fixed terminal 13 and the first heat dissipation member 41 and transferred to the substrate 100. Thereby, the thermal influence on the substrate 100 is reduced. Further, by changing the thickness ratio between the first heat dissipation member 41 and the first fixed terminal 13, the temperature rise values of the first heat dissipation member 41 and the first fixed terminal 13 can be arbitrarily adjusted.

The first heat dissipation member 41 is connected to the first fixed terminal 13 outside the housing 3. Therefore, the first heat dissipation member 41 can be retrofitted to the electromagnetic relay 1. It should be noted that the same effects as those of the first heat dissipation member 41 described above can be obtained from the second heat dissipation member 42 as well.

Figure 8:
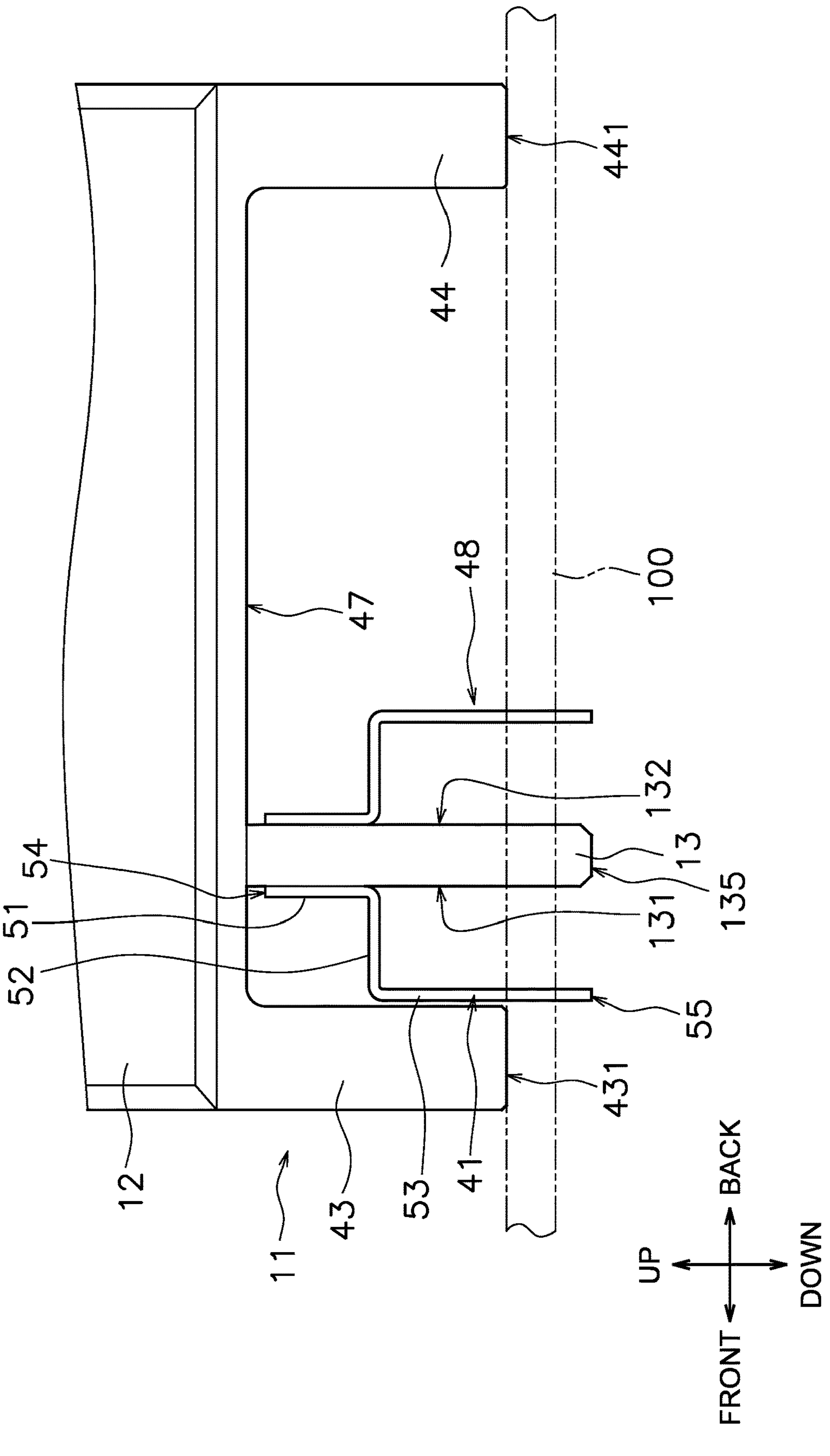
FIG. 8 is a side view showing the lower portion of the electromagnetic relay according to a first modification of the first embodiment.

FIG. 8 is a side view showing the lower portion of the electromagnetic relay 1 according to a first modification of the first embodiment. As shown in FIG. 8, the electromagnetic relay 1 may further include a third heat dissipation member 48. The third heat dissipation member 48 is disposed outside the housing 3. The third heat dissipation member 48 is provided separately from the first fixed terminal 13. The third heat dissipation member 48 is connected to the first fixed terminal 13. The third heat dissipation member 48 is provided separately from the first heat dissipation member 41.

The third heat dissipation member 48 has the same shape as the first heat dissipation member 41. The third heat dissipation member 48 is disposed on the side opposite to the first heat dissipation member 41 with respect to the first fixed terminal 13. Specifically, the third heat dissipation member 48 is disposed to face the second surface 132. The third heat dissipation member 48 is connected to the second surface 132.

In the electromagnetic relay 1 according to the first modification of the first embodiment, the third heat dissipation member 48 further improves the heat dissipation of the first fixed terminal 13. Although illustration is omitted, a fourth heat dissipation member may be connected to the second fixed terminal 14. The second heat dissipation member 42 and the fourth heat dissipation member are connected to the second fixed terminal 14 in the same way that the first heat dissipation member 41 and the third heat dissipation member 48 are connected to the first fixed terminal 13, respectively.

Figure 9:
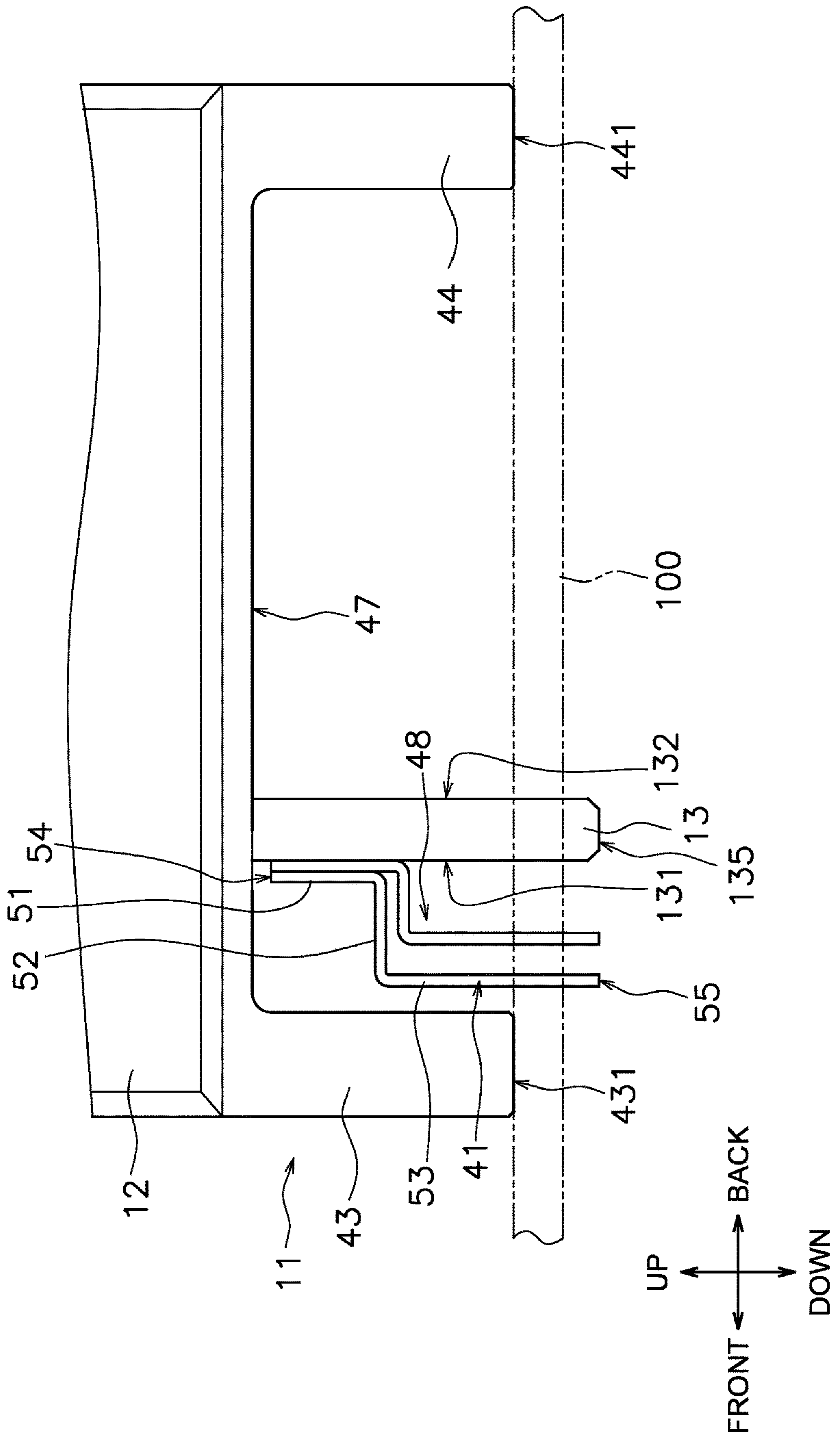
FIG. 9 is a side view showing the lower portion of the electromagnetic relay according to a second modification of the first embodiment.

FIG. 9 is a side view showing the lower portion of the electromagnetic relay 1 according to a second modification of the first embodiment. As shown in FIG. 9, the third heat dissipation member 48 may overlap the first heat dissipation member 41 and be disposed to face the first surface 131. The third heat dissipation member 48 may be disposed between the first heat dissipation member 41 and the first surface 131.

Figure 10:
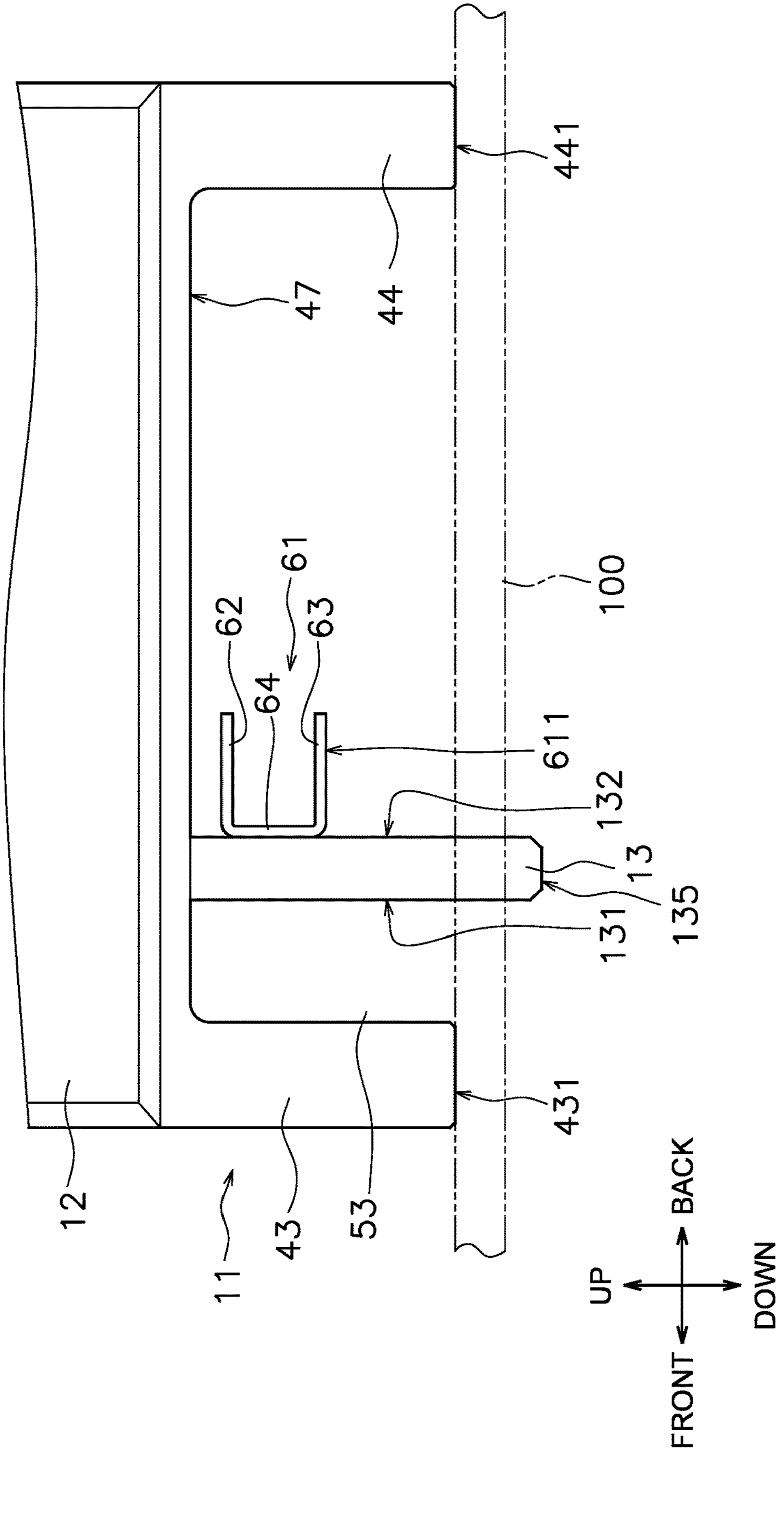
FIG. 10 is a side view showing the lower portion of the electromagnetic relay according to a second embodiment.

FIG. 10 is a side view showing the lower portion of the electromagnetic relay 1 according to a second embodiment. As shown in FIG. 10, the electromagnetic relay 1 according to the second embodiment includes a first heat dissipation member 61. As shown in FIG. 10, the first heat dissipation member 61 according to the second embodiment is connected to the first fixed terminal 13 and disposed outside the housing 3 in the same manner as the first heat dissipation member 41 according to the first embodiment.

A lower end 611 of the first heat dissipation member 61 is located above the lower ends 431 and 441 of the legs 43 and 44. The lower end 611 of the first heat dissipation member 61 is located above the lower end 135 of the first fixed terminal 13.

The first heat dissipation member 61 is not in contact with the substrate 100 and the current from the first fixed terminal 13 does not flow through the first heat dissipation member 61. The first heat dissipation member 61 does not function as an auxiliary terminal, but functions as a heat dissipation fin for improving the heat dissipation of the first fixed terminal 13.

Specifically, the first heat dissipation member 61 includes a first fin 62, a second fin 63, and a connecting portion 64. The first fin 62 extends in the front-rear direction from the first fixed terminal 13. The first fin 62 has a plate-like shape. The first fin 62 is disposed below the bottom surface 47 of the base 11. The second fin 63 extends in the front-rear direction from the first fixed terminal 13. The second fin 63 has a plate-like shape. The second fin 63 is disposed below the first fin 62. The second fin 63 is located above the lower ends 431 and 441 of the legs 43 and 44. The connecting portion 64 is located between the first fin 62 and the second fin 63. The connecting portion 64 is connected to the first fixed terminal 13.

The first heat dissipation member 61 has a bent shape between the first fin 62 and the connecting portion 64. The first heat dissipation member 61 has a bent shape between the second fin 63 and the connecting portion 64. The first heat dissipation member 61 is connected to the second surface 132 of the first fixed terminal 13. However, the first heat dissipation member 61 may be connected to the first surface 131 of the first fixed terminal 13. Although illustration is omitted, in the electromagnetic relay 1 according to the second embodiment, a second heat dissipation member similar to the first heat dissipation member 61 is connected to the second fixed terminal 14 in the same manner as in the first embodiment.

In the electromagnetic relay 1 according to the second embodiment, the first heat dissipation member 61 improves the heat dissipation performance of the electromagnetic relay 1 and suppresses the enlargement of the electromagnetic relay 1 as in the first embodiment.

Figure 11:
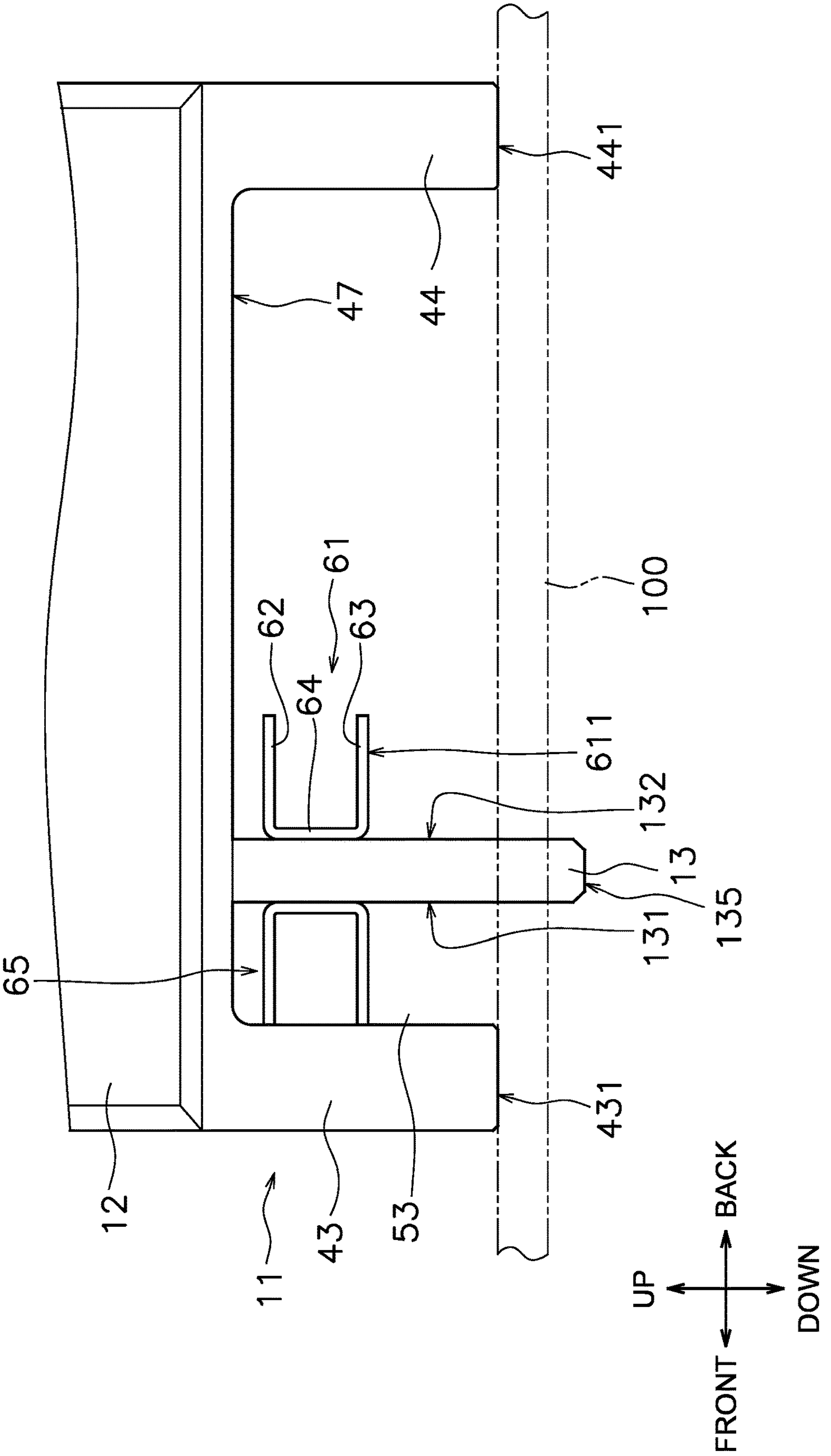
FIG. 11 is a side view showing the lower portion of the electromagnetic relay according to a first modification of the second embodiment.

FIG. 11 is a side view showing the lower portion of the electromagnetic relay 1 according to a first modification of the second embodiment. As shown in FIG. 11, the electromagnetic relay 1 may further include a third heat dissipation member 65. The third heat dissipation member 65 has the same shape as the first heat dissipation member 61. The third heat dissipation member 65 is connected to the first surface 131 of the first fixed terminal 13, and the first heat dissipation member 61 is connected to the second surface 132.

In the electromagnetic relay 1 according to the first modification of the second embodiment, the third heat dissipation member 65 further improves the heat dissipation of the first fixed terminal 13. Although illustration is omitted, a fourth heat dissipation member may be connected to the second fixed terminal 14. The second heat dissipation member and the fourth heat dissipation member may be connected to the second fixed terminal 14 in the same manner as the first heat dissipation member 61 and the third heat dissipation member 65 are attached to the first fixed terminal 13, respectively.

Figure 12:
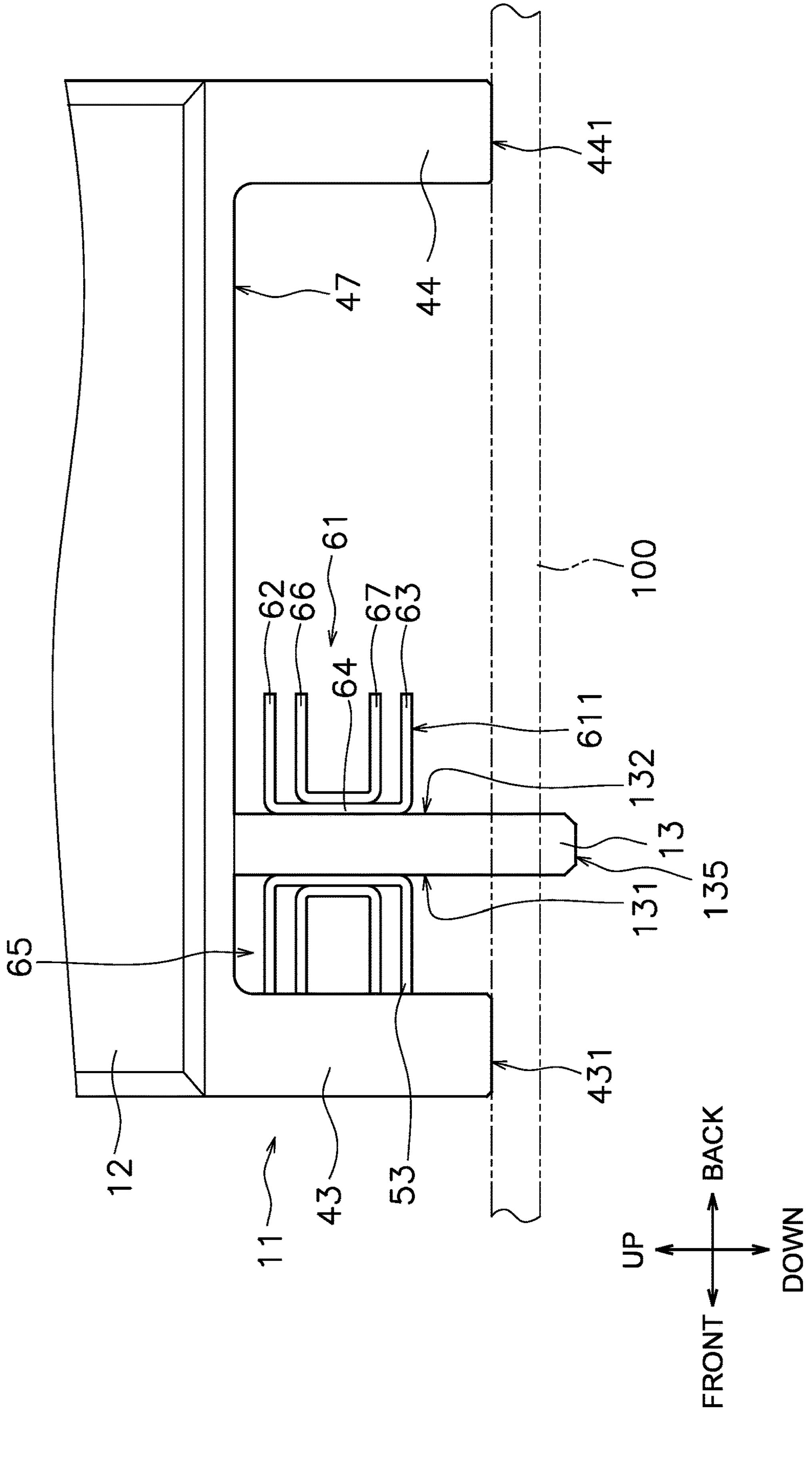
FIG. 12 is a side view showing the lower portion of the electromagnetic relay according to a second modification of the second embodiment.

FIG. 12 is a side view showing the lower portion of the electromagnetic relay 1 according to a second modification of the second embodiment. As shown in FIG. 12, the first heat dissipation member 61 may further include a third fin 66 and a fourth fin 67. The third fin 66 and the fourth fin 67 extend in the front-rear direction from the first fixed terminal 13. The third fin 66 and the fourth fin 67 are disposed between the first fin 62 and the second fin 63. The third heat dissipation member 65 has the same shape as the first heat dissipation member 61.

In the electromagnetic relay 1 according to the second modification of the second embodiment, the third fin 66 and the fourth fin 67 further improve the heat dissipation of the first fixed terminal 13. Although illustration is omitted, the second heat dissipation member has the same shape as the first heat dissipation member 61. The fourth heat dissipation member has the same shape as the third heat dissipation member 65.

Figure 13:
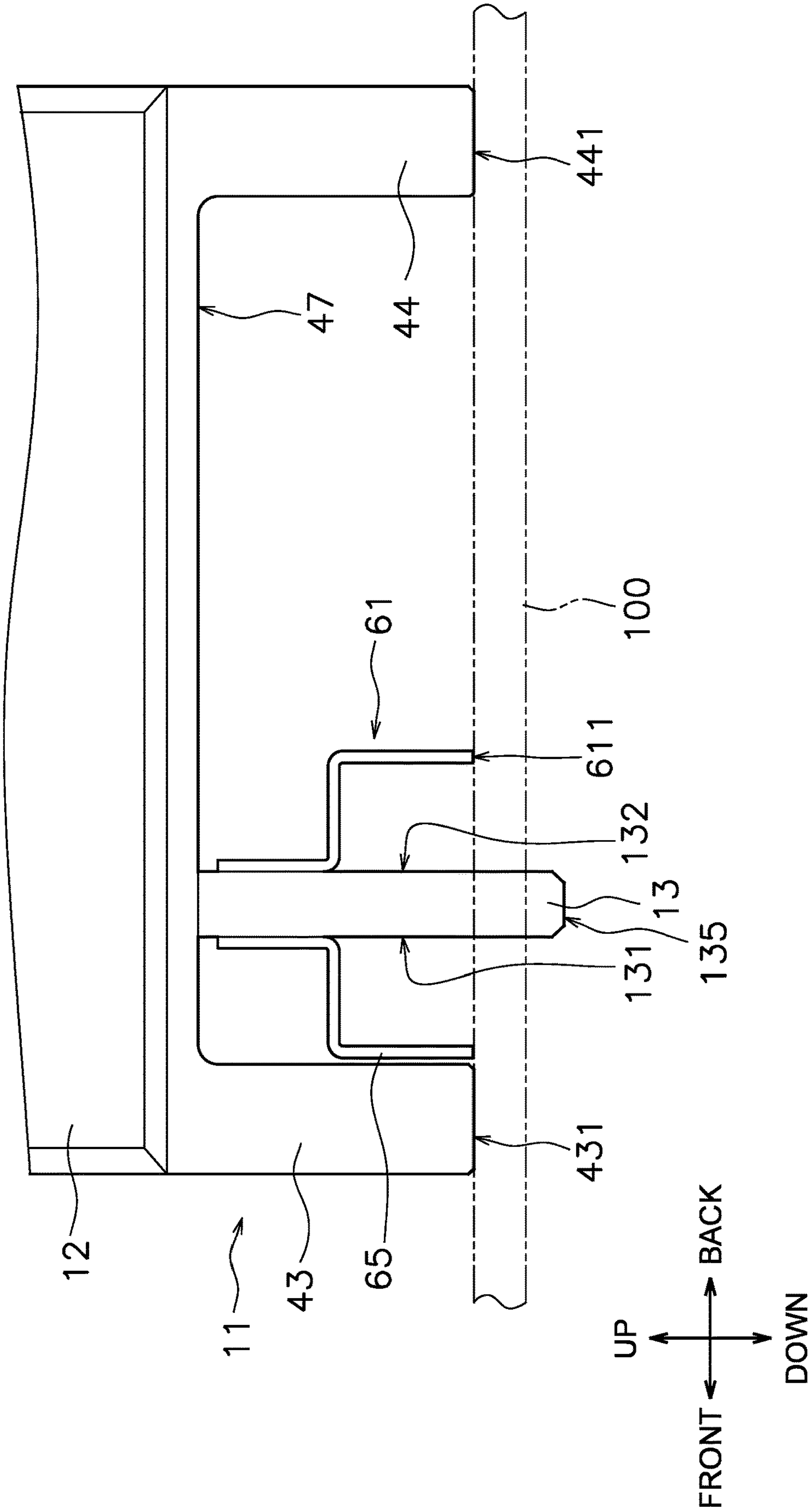
FIG. 13 is a side view showing the lower portion of an electromagnetic relay according to a third modification of the second embodiment.

FIG. 13 is a side view showing the lower portion of the electromagnetic relay 1 according to a third modification of the second embodiment. As shown in FIG. 13, the lower end 611 of the first heat dissipation member 61 may be located at the same height as the lower ends 431 and 441 of the legs 43 and 44. The lower end 611 of the first heat dissipation member 61 may be located at the same height as the lower end 135 of the first fixed terminal 13. The first heat dissipation member 61 may be configured to contact the substrate 100 but not pass current.

Although one embodiment of the present invention has been described above, the present invention is not limited to the above embodiments, and various modifications are possible without departing from the gist of the invention.

The structures of the contact device 2 and the drive device 4 are not limited to those of the above embodiment, and may be modified. For example, in the above-described embodiment, the electromagnetic relay 1 is of a so-called plunger type, but other types of electromagnetic relays such as a hinge type may be provided with the above-described heat dissipation member.

The shape or arrangement of the first fixed terminal 13, the second fixed terminal 14, the first movable contact piece 15, and the second movable contact piece 16 may be changed. For example, the first movable contact piece 15 and the second movable contact piece 16 may be integrated. That is, the first to fourth movable contacts 25 to 28 may be connected to an integrated movable contact piece. Alternatively, the second movable contact piece 16, the third and fourth movable contacts 27 and 28, and the third and fourth fixed contacts 23 and 24 may be omitted.

The first fixed contact 21 and the third fixed contact 23 may be integrated with the first fixed terminal 13. The first fixed contact 21 and the third fixed contact 23 may be omitted. The second fixed contact 22 and the fourth fixed contact 24 may be integrated with the second fixed terminal 14. The second fixed contact 22 and the fourth fixed contact 24 may be omitted.

The first movable contact 25 and the second movable contact 26 may be integrated with the first movable contact piece 15. The first movable contact 25 and the second movable contact 26 may be omitted. The third movable contact 27 and the fourth movable contact 28 may be integrated with the second movable contact piece 16. The third movable contact 27 and the fourth movable contact 28 may be omitted.

Figure 14:
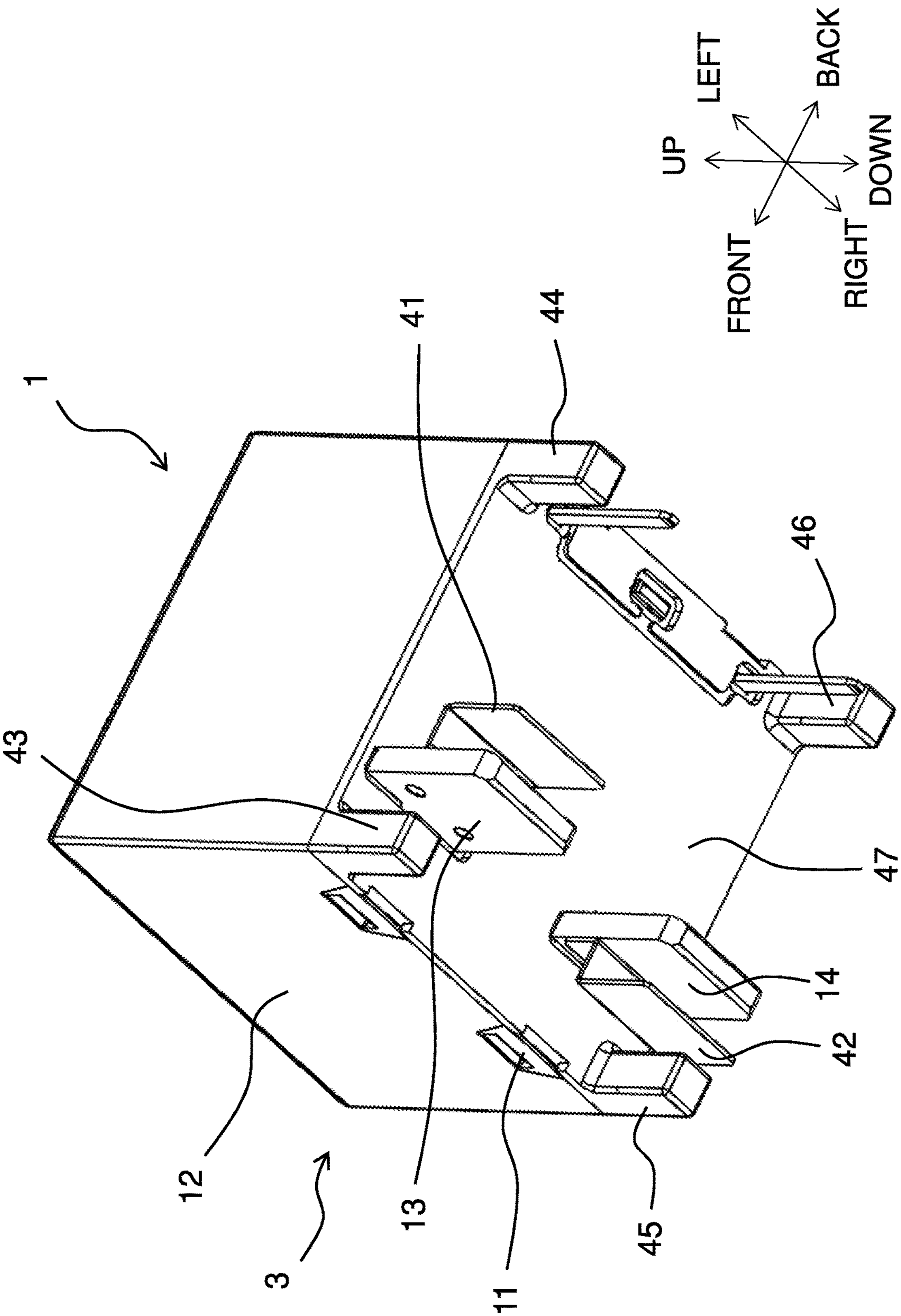
FIG. 14 is a bottom perspective view of the electromagnetic relay according to another embodiment.

In the first embodiment described above, the first heat dissipation member 41 and the second heat dissipation member 42 are disposed on the same side with respect to the first fixed terminal 13 and the second fixed terminal 14. However, the first heat dissipation member 41 and the second heat dissipation member 42 may be disposed on the sides opposite to each other with respect to the first fixed terminal 13 and the second fixed terminal 14. For example, as shown in FIG. 14, the first heat dissipation member 41 may be disposed behind the first fixed terminal 13 and the second heat dissipation member 42 may be disposed in front of the second fixed terminal 14. Alternatively, the first heat dissipation member 41 may be disposed in front of the first fixed terminal 13 and the second heat dissipation member 42 may be disposed behind the second fixed terminal 14. The first heat dissipation member 61 and the second heat dissipation member according to the second embodiment may also be disposed in the same manner as described above.

REFERENCE SIGNS LIST

3: Housing, 4: Drive device, 13: First fixed terminal, 14: Second fixed terminal, 15: First movable contact piece, 41: First heat dissipation member, 42: Second heat dissipation member, 65: Third heat dissipation member, 131: First surface, 132: Second surface

The invention claimed is:

1. An electromagnetic relay, comprising:

a housing;

a first fixed terminal extending from inside the housing to outside the housing, with the portion of the first fixed terminal lying outside the housing having a pair of major surfaces on opposite sides thereof and side surfaces disposed between the two major surfaces;

a movable contact piece disposed in the housing, the movable contact piece facing the first fixed terminal;

a drive device configured to move the movable contact piece in a contact direction and an opening direction, the contact direction being a direction in which the movable contact piece contacts the first fixed terminal, the opening direction being a direction in which the movable contact piece is separate from the first fixed terminal; and a first heat dissipation member disposed outside the housing, the first heat dissipation member being provided as a separate component from the first fixed terminal, the first heat dissipation member being attached to one of the major surfaces of the portion of the first fixed terminal lying outside the housing in heat-transferring relationship therewith, the first heat dissipation member including a terminal portion that is 1) spaced apart from said one of the major surfaces of the portion of the first fixed terminal lying outside the housing and that 2) extends in the same direction as the first fixed terminal.

2. The electromagnetic relay according to claim 1, wherein the first heat dissipation member has a bent shape.

3. The electromagnetic relay according to claim 1, wherein the first heat dissipation member is an auxiliary terminal through which a current from the first fixed terminal is branched.

4. The electromagnetic relay according to claim 3, wherein a lower end of the first heat dissipation member is located below a lower end of the housing.

5. The electromagnetic relay according to claim 3, wherein a lower end of the first heat dissipation member is located at the same height as a lower end of the first fixed terminal or lower than the lower end of the first fixed terminal.

6. The electromagnetic relay according to claim 1, wherein the first heat dissipation member is a heat radiating fin through which a current from the first fixed terminal does not flow.

7. The electromagnetic relay according to claim 6, wherein a lower end of the first heat dissipation member is located above a lower end of the housing.

8. The electromagnetic relay according to claim 6, wherein a lower end of the first heat dissipation member is located above a lower end of the first fixed terminal.

9. The electromagnetic relay according to claim 1, further comprising a second fixed terminal extending from inside the housing to outside the housing, with the portion of the second fixed terminal lying outside the housing having a pair of major surfaces on opposite sides thereof and side surfaces disposed therebetween; and a second heat dissipation member disposed outside the housing, the second heat dissipation member being provided as a separate component from the second fixed terminal, the second heat dissipation member being attached to one of the major surfaces of the portion of the second fixed terminal lying outside the housing in heat-transferring relationship therewith, the second heat dissipation member including a terminal portion that is 1) spaced apart from said one of the major surfaces of the portion of the second fixed terminal lying outside the housing and that 2) extends in the same direction as the second fixed terminal, wherein the first heat dissipation member and the second heat dissipation member are disposed on the same side with respect to the first fixed terminal and the second fixed terminal, respectively.

10. The electromagnetic relay according to claim 1, further comprising a second fixed terminal extending from inside the housing to outside the housing, with the portion of the second fixed terminal lying outside the housing having a pair of major surfaces on opposite sides thereof and side surfaces disposed therebetween; and a second heat dissipation member disposed outside the housing, the second heat dissipation member being provided as a separate component from the second fixed terminal, the second heat dissipation member being attached to one of the major surfaces of the portion of the second fixed terminal lying outside the housing in heat-transferring relationship therewith, the second heat dissipation member including a terminal portion that is 1) spaced apart from said one of the major surfaces of the portion of the second fixed terminal lying outside the housing and that 2) extends in the same direction as the second fixed terminal, wherein the first heat dissipation member and the second heat dissipation member are disposed on opposite sides with respect to the first fixed terminal and the second fixed terminal, respectively.

11. The electromagnetic relay according to claim 1, further comprising an additional heat dissipation member disposed outside the housing, the additional heat dissipation member being provided as a separate component from the first fixed terminal, the additional heat dissipation member being attached to one of the major surfaces of the portion of the first fixed terminal lying outside the housing in heat-transferring relationship therewith, the additional heat dissipation member being provided separately from the first heat dissipation member.

12. The electromagnetic relay according to claim 11, wherein the first heat dissipation member is attached to said one of the major surfaces of the portion of the first fixed terminal lying outside the housing, and the additional heat dissipation member is attached to the other of the major surfaces of the portion of the first fixed terminal lying outside the housing, on the opposite side of the portion of the first fixed terminal lying outside the housing as the first heat dissipation member.

13. The electromagnetic relay according to claim 11, wherein the first heat dissipation member is disposed to face the first surface attached to said one of the major surfaces of the portion of the first fixed terminal lying outside the housing, the additional heat dissipation member overlaps the first heat dissipation member, and the additional heat dissipation member is also attached to said one of the major surfaces of the portion of the first fixed terminal lying outside the housing.

* * * * *